US010838656B2

(12) United States Patent
Fan et al.

(10) Patent No.: US 10,838,656 B2
(45) Date of Patent: Nov. 17, 2020

(54) PARALLEL MEMORY ACCESS TO ON-CHIP MEMORY CONTAINING REGIONS OF DIFFERENT ADDRESSING SCHEMES BY THREADS EXECUTED ON PARALLEL PROCESSING UNITS

(71) Applicant: MediaTek Inc., Hsinchu (TW)

(72) Inventors: Po-Chun Fan, Zhubei (TW); Pei-Kuei Tsung, New Taipei (TW); Sung-Fang Tsai, Hsinchu (TW); Chia-Hsien Chou, Zhubei (TW); Shou-Jen Lai, Zhubei (TW)

(73) Assignee: MediaTek Inc., Hsinchu (TW)

( * ) Notice: Subject to any disclaimer, the term of this patent is extended or adjusted under 35 U.S.C. 154(b) by 0 days.

(21) Appl. No.: 15/675,710

(22) Filed: Aug. 12, 2017

(65) Prior Publication Data
US 2018/0173463 A1    Jun. 21, 2018

Related U.S. Application Data

(60) Provisional application No. 62/436,487, filed on Dec. 20, 2016.

(51) Int. Cl.
*G06F 3/06* (2006.01)
*G06F 12/06* (2006.01)
*G06F 12/0806* (2016.01)

(52) U.S. Cl.
CPC .......... *G06F 3/0659* (2013.01); *G06F 3/0611* (2013.01); *G06F 3/0685* (2013.01); *G06F 12/0638* (2013.01); *G06F 12/0806* (2013.01); *G06F 2212/1024* (2013.01); *G06F 2212/205* (2013.01)

(58) Field of Classification Search
CPC .... G01S 13/003; G01S 13/878; G01S 5/0273; G01S 13/0209; G01S 13/765; G01S 2013/462; G01S 13/931; G01S 2013/9314; G06F 3/0659; G06F 12/0806; G06F 3/0611; G06F 3/0685; G06F 12/0638; G06F 2212/1024; G06F 2212/205; G06F 12/023; G06F 12/0284; G06F 2212/1016
USPC .................... 711/212, 202, 217, 154; 712/14
See application file for complete search history.

(56) References Cited

U.S. PATENT DOCUMENTS

| 6,209,066 B1 | 3/2001 | Hölzle et al. |
| 9,229,830 B2 | 1/2016 | Yamada |
| 2005/0141318 A1* | 6/2005 | Lee .......... G11C 8/12 365/226 |
| 2011/0072211 A1 | 3/2011 | Duluk, Jr. |

(Continued)

*Primary Examiner* — Hong C Kim
(74) *Attorney, Agent, or Firm* — Tong J. Lee (57) ABSTRACT

A system is provided to manage on-chip memory access for multiple threads. The system comprises multiple parallel processing units to execute the threads, and an on-chip memory including multiple memory units and each memory unit includes a first region and a second region. The first region and the second region have different memory addressing schemes for parallel access by the threads. The system further comprises an address decoder coupled to the parallel processing units and the on-chip memory. The address decoder is operative to activate access by the threads to memory locations in the first region or the second region according to decoded address signals from the parallel processing units.

21 Claims, 6 Drawing Sheets

(56) References Cited

U.S. PATENT DOCUMENTS

| | | | |
|---|---|---|---|
| 2012/0089792 A1* | 4/2012 | Fahs | G06F 9/30036 |
| | | | 711/154 |
| 2012/0221808 A1* | 8/2012 | Coon | G06F 12/084 |
| | | | 711/154 |
| 2012/0303870 A1 | 11/2012 | Park | |
| 2013/0262817 A1* | 10/2013 | Bybell | G06F 12/1027 |
| | | | 711/208 |
| 2014/0189283 A1* | 7/2014 | Lim | G11C 29/82 |
| | | | 711/202 |

* cited by examiner

FIG. 6

PARALLEL MEMORY ACCESS TO ON-CHIP MEMORY CONTAINING REGIONS OF DIFFERENT ADDRESSING SCHEMES BY THREADS EXECUTED ON PARALLEL PROCESSING UNITS

CROSS-REFERENCE TO RELATED APPLICATIONS

This application claims the benefit of U.S. Provisional Application No. 62/436,487 filed on Dec. 20, 2016, the entirety of which is incorporated by reference herein.

TECHNICAL FIELD

Embodiments of the invention relate to on-chip memory addressing and access in a parallel computing system.

BACKGROUND

The design of a memory subsystem has a significant impact on the memory access speed. Frequently accessed data can be stored on-chip, such as in a cache, buffer, or other low-latency memory devices. Data that is less frequently used, or is predicted to be less frequently used, can be stored in an off-chip memory, such as the dynamic random access memory (DRAM), hard drive or other high-capacity memory devices that typically have a higher-latency and lower speed than the on-chip memory.

In a parallel computing system, a process may include multiple threads and the multiple threads may access an on-chip memory at the same time. Memory bandwidth is increased when the on-chip memory supports vectorized data access; e.g., when the threads access consecutive data elements in a data array stored in the on-chip memory. However, different parallel computations call for different memory access patterns. For example, in a histogram computation, each thread may be given the task of updating a bin value that represents the number of pixels having a given range of pixel values. The threads may process the pixel values in parallel, but the memory locations storing the corresponding bins may not follow a uniform pattern. As such, conflicts often arise in memory access by multiple threads during histogram computations.

Thus, there is a need for improving memory access efficiency in a parallel computing system.

SUMMARY

In one embodiment, a system is provided to manage on-chip memory access for a plurality of threads. The system comprises: a plurality of parallel processing units to execute the threads; and an on-chip memory including a plurality of memory units and each memory unit includes a first region and a second region. The first region and the second region have different memory addressing schemes for parallel access by the threads. The system further comprises an address decoder coupled to the parallel processing units and the on-chip memory. The address decoder is operative to activate access by the threads to memory locations in one of the first region and the second region according to decoded address signals from the parallel processing units.

In another embodiment, a system is provided operative to manage memory allocation. The system comprises: a plurality of parallel processing units; and an on-chip memory including a plurality of memory units and each memory unit includes a first region and a second region. The first region and the second region have different memory addressing schemes for parallel access by the threads. The system further comprises an address decoder coupled to the parallel processing units and the on-chip memory. The address decoder is operative to: receive requests from the threads to access an on-chip memory in parallel, each request specifying a requested address for memory access; determine whether the requested address is in the first region or the second region of the on-chip memory according to a boundary between the first region and the second region; and activate access by the threads to memory locations in one of the first region and the second region.

In yet another embodiment, a method is provided for an address decoder, where the address decoder is coupled to parallel processing units that execute a plurality of threads of a process. The method comprises: receiving requests from the threads to access in parallel an on-chip memory that includes a plurality of memory units, each request specifying a requested address for memory access; determining whether the requested address is in a first region or a second region of the on-chip memory according to a boundary between the first region and the second region, wherein the first region and the second region have different memory addressing schemes for parallel access by the threads; and activating access by the threads to memory locations in one of the first region and the second region.

The embodiments of the invention enable efficient access to an on-chip memory by multiple threads in parallel. Advantages of the embodiments will be explained in detail in the following descriptions.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide a system and method for efficient on-chip memory access in a parallel computing system. The term "on-chip memory" as used herein refers to the memory units provided on the same chip as the processors using the memory units, such as in a system-on-a-chip (SOC) computing system. In one embodiment, the on-chip memory address space may be divided into two regions: a direct access memory addressing region (DAR) and an indirect access memory addressing region (IDAR). Between the DAR and the IDAR is a boundary which defines the sizes of the two regions. The boundary may be configurable by software or may be hardwired. Each region is best suited for a specific pattern of parallel (equivalently, concurrent) memory access by multiple threads. When the memory access pattern matches the addressing scheme of the allocated region, the threads may access the on-chip memory in parallel in one memory access cycle. In one embodiment, one memory access cycle may be the same as one clock cycle.

Figure 1:
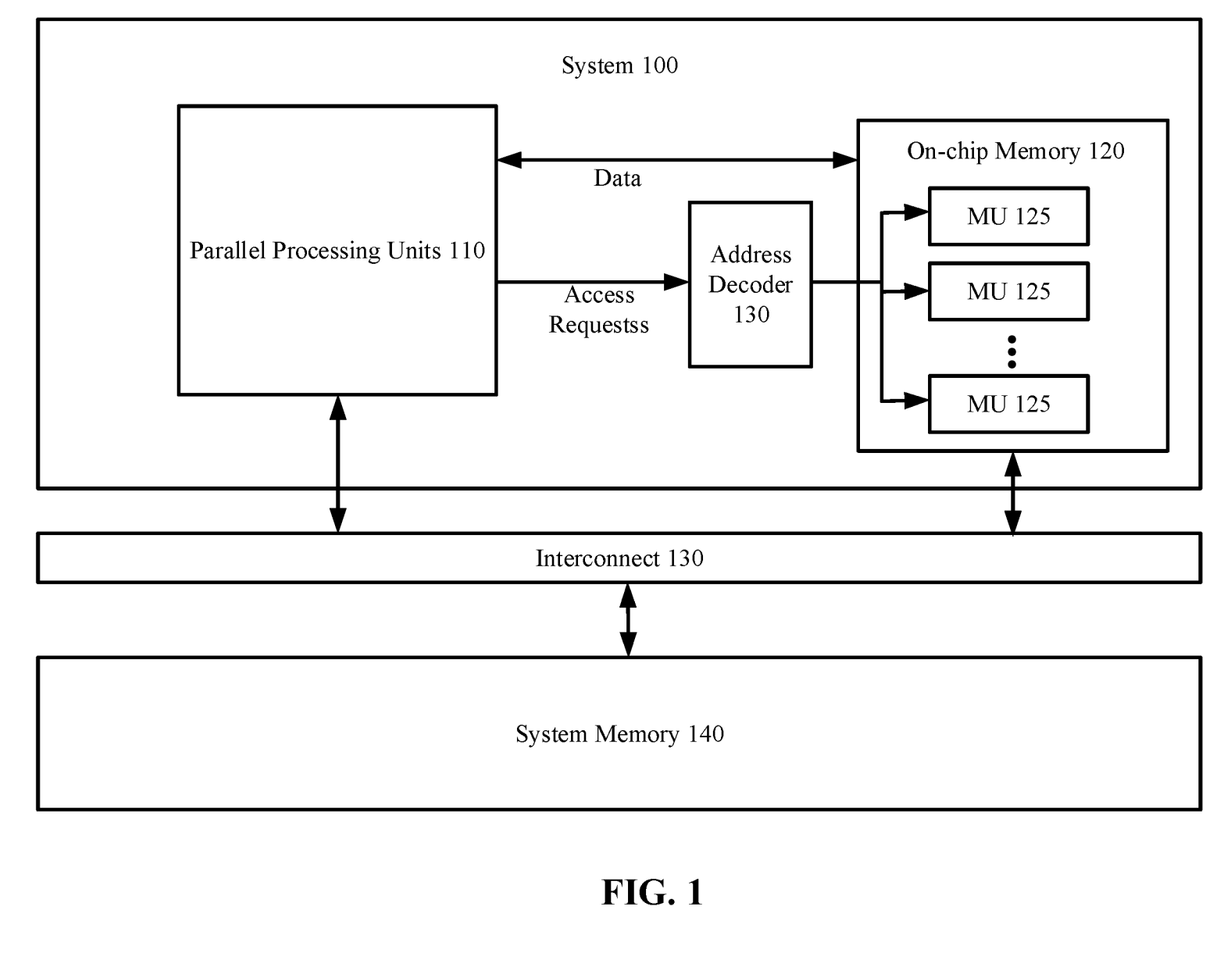
FIG. 1 illustrates an example of a parallel computing system according to one embodiment.

FIG. 1 illustrates a system 100 according to one embodiment. The system 100 may be an SOC system. The system 100 includes a plurality of parallel processing units 110 and an on-chip memory 120. Each parallel processing unit 110 may be a processor including circuitry operative to perform arithmetic and/or logical operations, such as a central processing unit (CPU), a processing element in a vector processor, an arithmetic and logical unit (ALU), etc. The on-chip memory 120 may include a plurality of memory units 125, such as static random access memory (SRAM) or other high throughput, low latency memory compared to off-chip memory such as dynamic random access memory (DRAM). An address decoder 130 is coupled to the on-chip memory 120 to decode address signals from the parallel processing units 110 to destination addresses in the on-chip memory 120. The system 100 may be coupled to an off-chip memory; i.e., a system memory 140 such as volatile memory and/or non-volatile memory, via an interconnect 130, a bus, or other types of interconnections. The system 100 may be part of a computing device, a communication device, or a combination of computing and communication device. The system 100 may include additional elements not shown in FIG. 1; e.g., additional processors; network interfaces, such as antennas, receivers and transmitters; user interfaces, such as a display, a touch screen, one or more buttons, a touch pad; etc.

Figure 2:
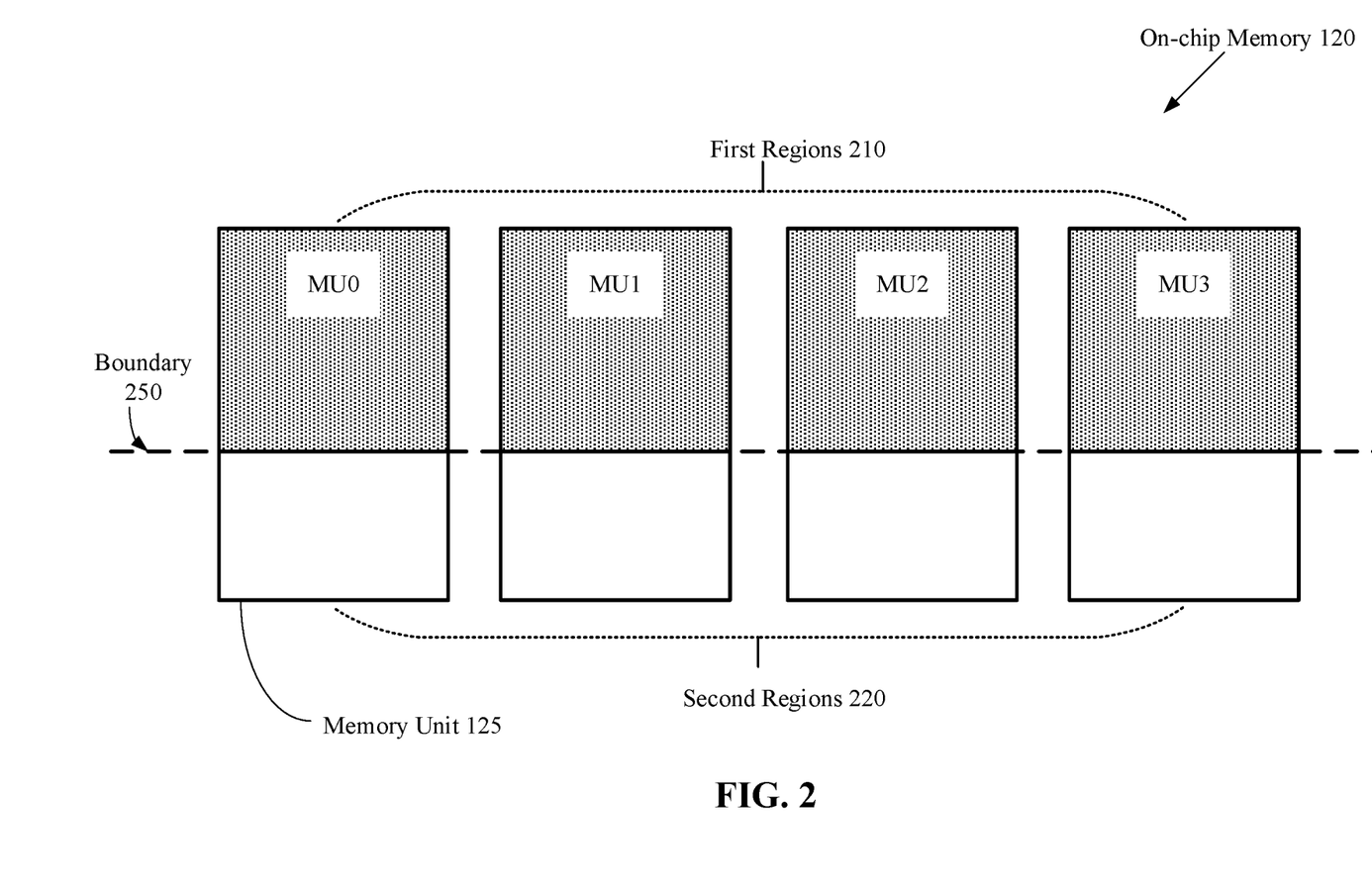
FIG. 2 illustrates a hybrid addressing scheme for an on-chip memory according to one embodiment.

FIG. 2 illustrates further details of the on-chip memory 120 according to one embodiment. In one embodiment, each memory unit 125 in the on-chip memory 120 is an SRAM module. In alternative embodiments, other types of memory units 125 suitable for on-chip implementations may also be used. For simplicity of illustration, FIG. 2 shows four memory units 125 (e.g., MU0, MU1 MU2 and MU3), and each memory unit 125 contains a first region 210 (shown as a dotted region) and a second region 220 (shown as a white region). It should be understood that the on-chip memory 120 may contain any number of memory units 125. In one embodiment, the first region 210 is a DAR, and the second region 220 is an IDAR. The first region 210 and the second region 220 have different memory addressing schemes for parallel access by multiple threads. The boundary between the first region 210 and the second region 220 may be configured by software or may be hardwired. In one embodiment, the boundary may be uniformly set across all of the memory units 125 such that all of the first regions 210 have the same size and all of the second regions 220 have the same size. In some embodiments, each memory unit 125 may include memory region or regions in addition to the first region 210 and the second region 220.

Referring also to FIG. 1, when the parallel processing units 110 execute a process having multiple parallel threads, memory locations may be allocated to the threads in one of the first region 210 and the second region 220 (that is, either the first region 210 or the second region 220) based on the memory access pattern of the process. In one embodiment, the operating system (OS) at runtime, or the compiler at compile time may determine one of the regions to allocate memory to the multiple threads to achieve efficient memory access. In one embodiment, a programmer may specify one of the regions for memory allocation to the multiple threads.

During execution of the process, the threads may send memory access requests for accessing the on-chip memory 120 in parallel. The memory access requests include address signals, which are decoded by the address decoder 130. According to the decoded address signals, the address decoder 130 activates or causes to activate the access to memory locations in either the first region 210 or the second region 220. The memory locations described herein are of the same size. Each memory location may have the size of a 16-bit, 32-bit, or 64-bit word; other data sizes may also be used.

Figure 3:
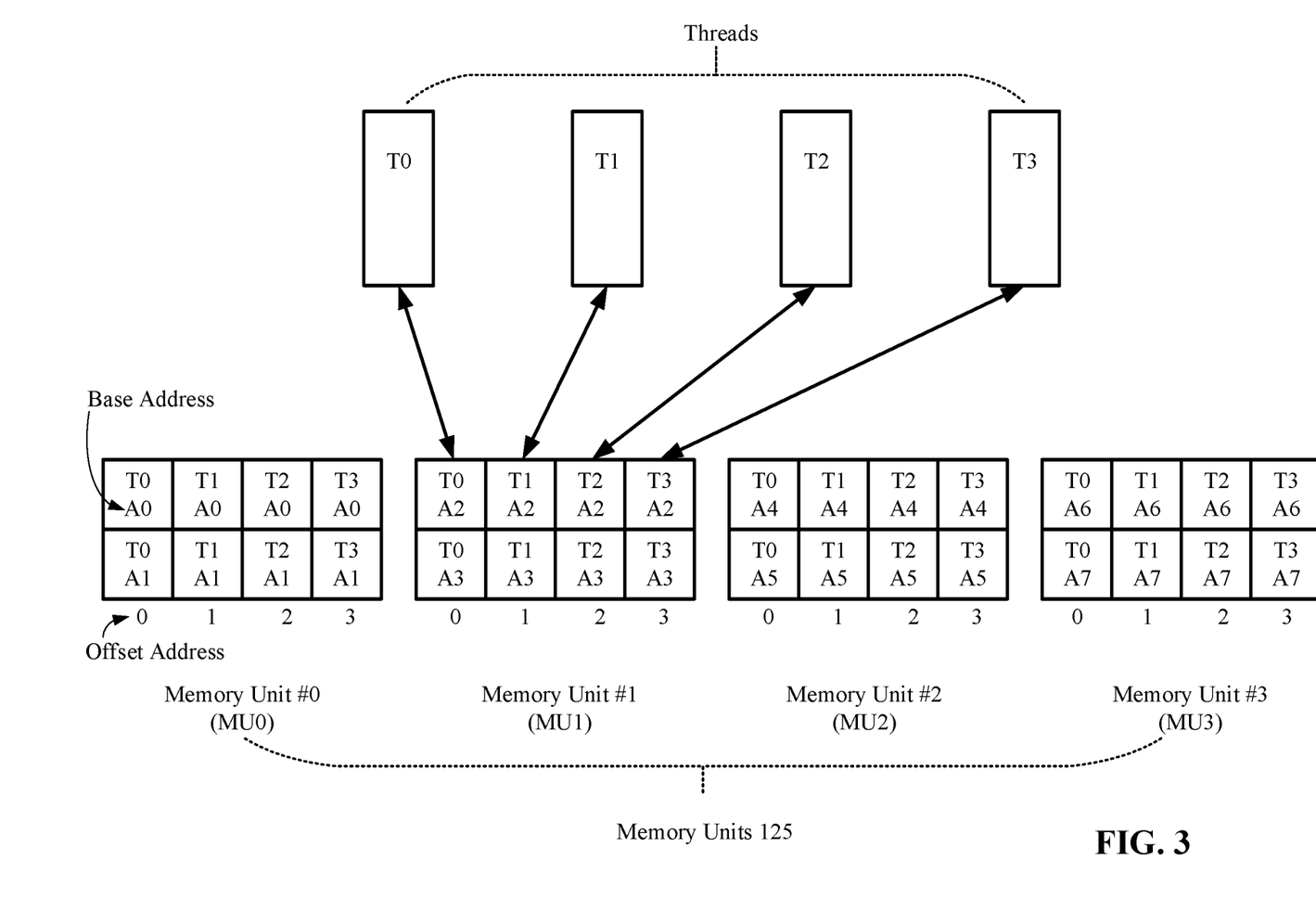
FIG. 3 illustrates a first memory addressing scheme according to one embodiment.

FIG. 3 illustrates multiple threads accessing the first region 210 of the memory units 125 in the on-chip memory 120 according to one embodiment. Although FIG. 3 shows four memory units 125 (MU0, MU1 MU2 and MU3), it should be understood that the on-chip memory 120 may contain any number of memory units. Moreover, although FIG. 3 shows only the first region 210 in each memory unit 125, it should be understood that each memory unit 125 further includes the second region 220 (FIG. 2) not shown in this figure. In this example, four parallel threads T0, T1, T2 and T3 have been allocated with memory locations in the first regions 210 and are accessing the first regions 210. When given the same base address (e.g., A2), the four threads may concurrently access consecutive locations (with offsets 0, 1, 2 and 3, respectively) in the same memory unit (e.g., MU1) in one memory access cycle, as shown in FIG. 3 by the four arrowed lines. The first region 210 is a DAR, i.e., the direct access memory addressing region, in which the threads' allocated memory locations are uniformly distributed within each memory unit 125 as well as across different memory units 125. Each thread is allocated with memory locations at a fixed offset address; e.g., T0's allocated memory locations are at offset address 0 of each base address (A0, A1, A2, etc.), and T1's allocated memory locations are at offset address 1 of each base address (A0, A1, A2, etc.), and so on. Moreover, the memory locations allocated to each thread are separated by a fixed number of memory locations; in this example the fixed number is four, which is the number of threads.

Threads that incur uniform memory access may be allocated with the first region 210 of the on-chip memory 120 to achieve high memory access efficiency. For example, in some image processing applications, the values of consecutive pixels along a given direction are stored in consecutive memory locations. A process may include multiple threads and each thread may have the same memory access pattern such as reading the values of neighboring pixels and writing an averaged pixel value into an array element. In one embodiment, such memory read and write may be performed as vectorized read and write, and the first region 210 is best suited for vectorized read and write as well as other type uniform memory access.

Figure 4:
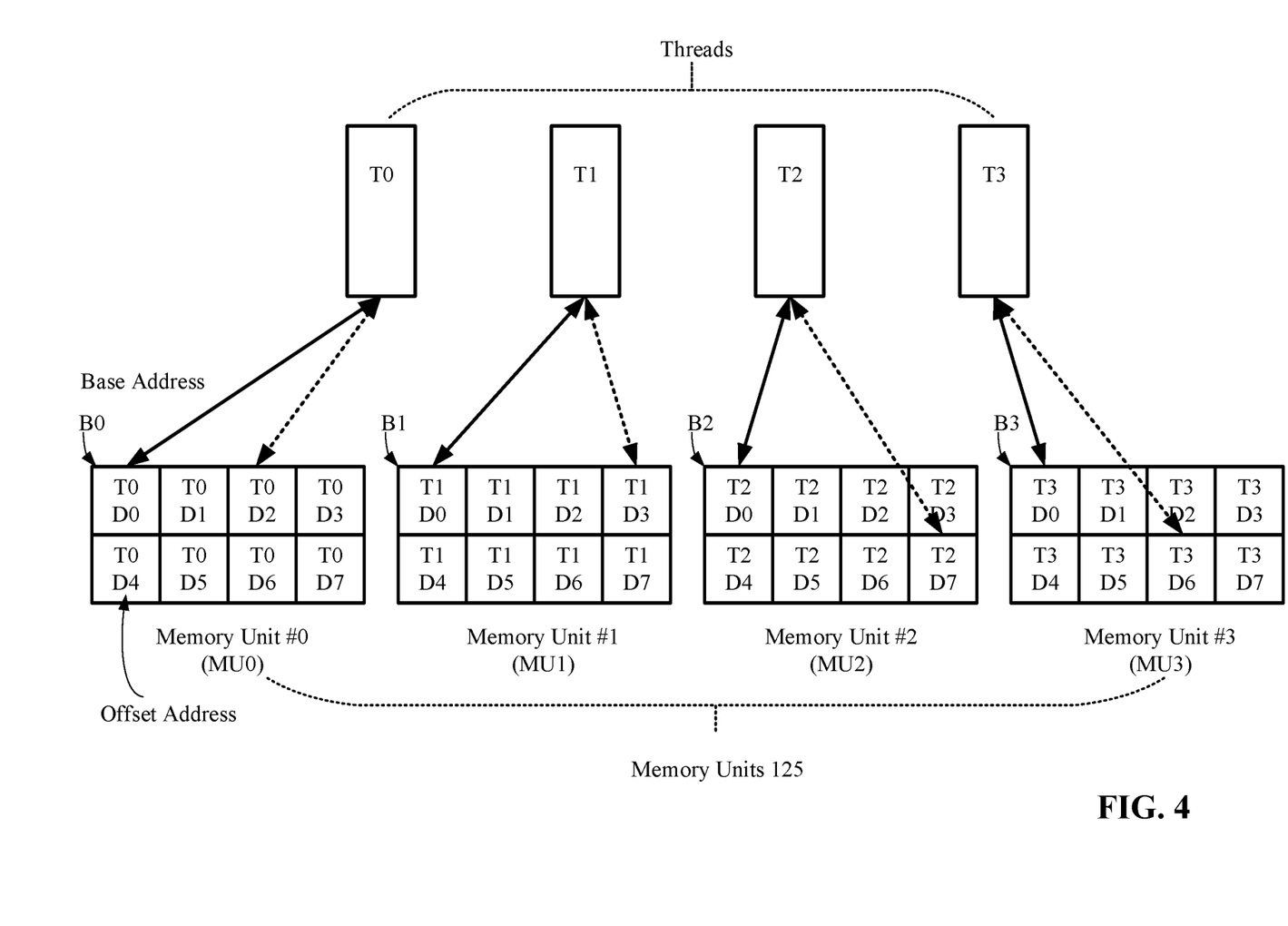
FIG. 4 illustrates a second memory addressing scheme according to one embodiment.

FIG. 4 illustrates multiple threads accessing the second region 220 of the on-chip memory 120 according to one embodiment. It is noted that according to this memory address scheme, different threads are allocated with different memory units 125. In other words, each thread is allocated with the second region 220 of a respective one or more memory units 125. Although FIG. 4 shows four memory units 125 (MU0, MU1 MU2 and MU3), it should be understood that the on-chip memory 120 may contain any number of memory units. Moreover, although FIG. 4 shows only the second region 220 in each of the four memory units 125, it should be understood that each memory unit 125 further includes the first region 210 (FIGS. 2 and 3) not shown in this figure.

In this example, four parallel threads T0, T1, T2 and T3 have been allocated with memory locations in the second regions 220 and are accessing the second region 220. When given different base addresses that correspond to the boundaries of the respective second regions 220 (e.g., B0, B1, B2 and B3) and the same offset address (e.g., D0), the four threads concurrently access the corresponding memory locations in different memory units (e.g., MU0, MU1, MU2 and MU3, respectively) in one memory access cycle, as shown in FIG. 4 by the four solid arrowed lines.

In one embodiment, each thread may be provided with its own read and write pointer for the memory unit 125 to which the thread is allocated. For example, T0 is allocated with MU0, and by using its read and write pointer, T0 may access any location within the second region 220 in MU0 independent of other threads. The same memory access method applies to the other threads.

Thus, the four threads may be given different offset addresses (e.g., D2, D3, D7 and D6, respectively) and may concurrently access their respective allocated memory space independent of other threads in one memory access cycle, as shown in FIG. 4 by the four dotted arrowed lines. As mentioned before, the second region 220 is an IDAR, i.e., the indirect access memory addressing region, in which each thread is allocated with a segment of consecutive memory locations in a memory unit 125. In one embodiment, each thread is allocated with an entire second region 220 in a memory unit 125.

In an example where a process computes a histogram of an image, each thread may be given the task of updating a bin that represents the number of pixels having a given range of pixel values. Each thread may read a pixel value from a portion of an image and increment a bin value corresponding to the pixel value. At any given time, the different threads may be updating the same bin, or may be updating different bins. Mapping consecutive bins to consecutive memory locations in the same memory unit 125 according to the addressing scheme of the first region 210 would likely cause frequent memory access conflicts among the threads. Allocating the second regions 220 of different memory units 125 to the different threads allows the threads to concurrently accessing different memory units 125 without conflicts. As such, the memory access efficiency can be improved.

It should be noted, however, the base address and the offset address in the first region 210 and those in the second region 220 may be different (e.g., have different bit widths). In the following description, the base address and the offset address in the first region 210 are referred to as the first base address and the first offset address, respectively. The base address and the offset address in the second region 220 are referred to as the second base address and the second offset address, respectively.

Figure 5:
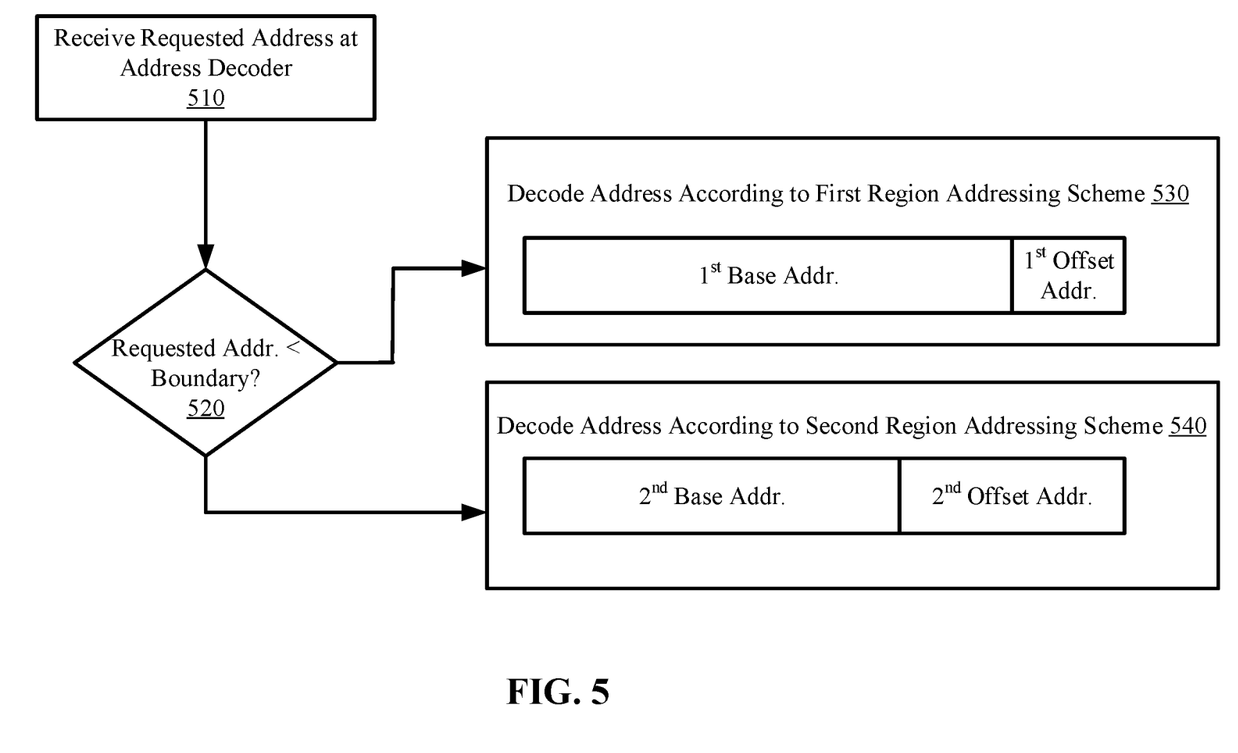
FIG. 5 is a flow diagram illustrating an address decoding process according to one embodiment.

FIG. 5 is a flow diagram illustrating address decoding performed by the address decoder 130 (FIG. 1) for a system (e.g., the system 100) to manage on-chip memory access by multiple threads according to one embodiment. When the address decoder 130 receives a requested address for memory access at step 510, it compares the requested address with the boundary address that marks the end of the first region 210 and the start of the second region 220 at step 520. In one embodiment, the boundary address may be a collection of per-unit boundary addresses, each of which marks the end of the first region 210 and the start of the second region 220 in one memory unit 125. The address decoder 130 may first determine to which memory unit 125 the requested address points, and then determine in which region the requested address is.

If the requested address is less than the boundary address, the address decoder 130 decodes the requested address according to the addressing scheme of the first region 210 at step 530. The number of bits in the offset address of the first region 210 (a.k.a. the first offset address) may correspond to the number of threads; for the four thread example described in FIG. 3, two bits may be used as the first offset address. The remaining bits in the requested address is the first base address, which identifies the base address A0, A1, A2, etc., shown in FIG. 3.

If the requested address is not less than the boundary address, the address decoder 130 decodes the requested address according to the addressing scheme of the second region 220 at step 540. The number of bits in the offset address of the second region 210 (a.k.a. the second offset address) may correspond to the size of the second region 220; for the example described in FIG. 4 where eight memory locations are allocated to each thread, three bits may be used as the second offset address. The remaining bits in the requested address is the second base address, which identifies the base address B0, B1, B2, etc., shown in FIG. 4. It is noted that each of the second base addresses also marks the beginning of the second region 220 for the respective memory unit 125. In one embodiment, the second base addresses may collectively be used as the boundary address for the address decoder 130 to determine whether a requested address falls in the first region 210 or the second region 220.

Figure 6:
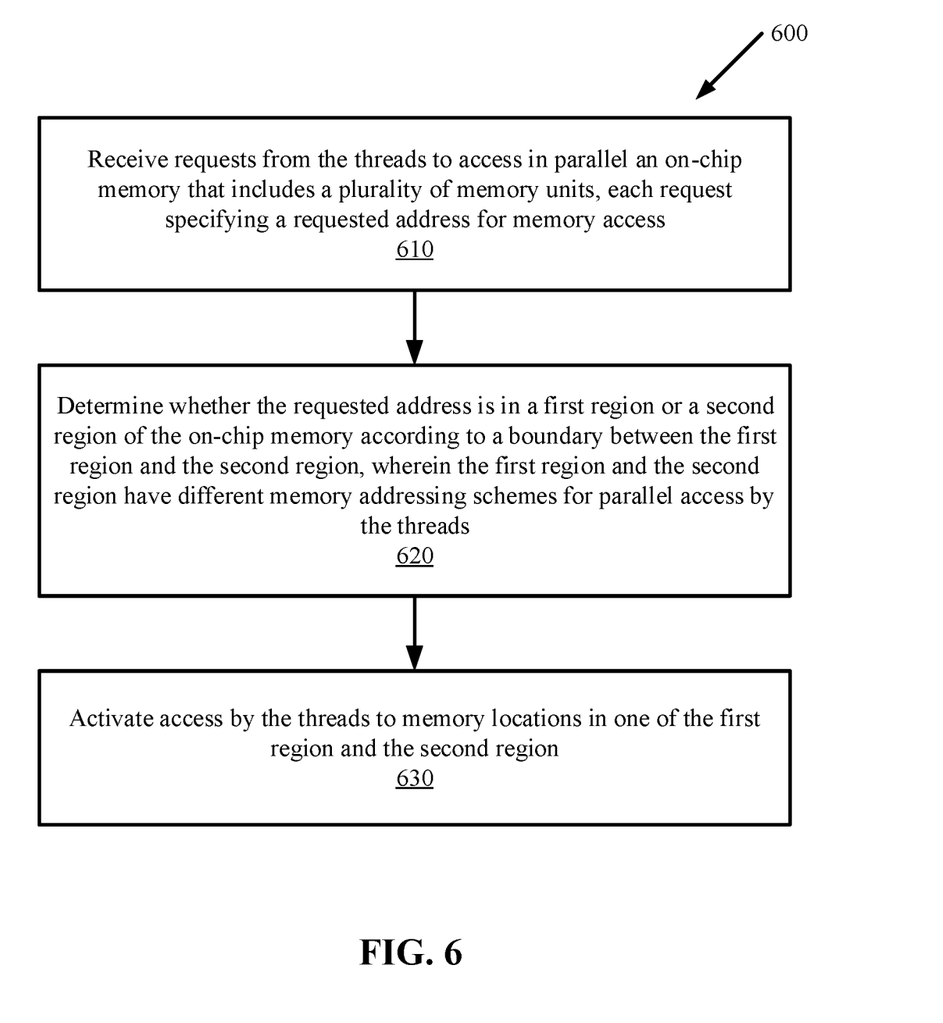
FIG. 6 is a flow diagram illustrating a method performed by an address decoder for managing parallel memory access by multiple threads according to one embodiment.

FIG. 6 is a flow diagram illustrating a method 600 performed by an address decoder (e.g., the address decoder 130 of FIG. 1) for managing parallel memory access by multiple threads of a process according to one embodiment. The address decoder is coupled to parallel processing units that execute the threads, and is also coupled to an on-chip memory that includes a plurality of memory units.

The method 600 begins with the address decoder receiving requests from the threads to access in parallel the on-chip memory, each request specifying a requested address for memory access (step 610). The address decoder determines whether the requested address is in a first region or a second region of the on-chip memory according to a boundary between the first region and the second region, wherein the first region and the second region have different memory addressing schemes for parallel access by the threads (step 620). The address decoder then activates access by the threads to memory locations in one of the first region and the second region (step 630).

Thus, according to the DAR memory addressing scheme, the multiple threads may use the same base address with different offsets to access consecutive locations in the same on-chip memory unit. According to the IDAR memory addressing scheme, the multiple threads may use different base addresses with the same offset address to access corresponding locations in different on-chip memory units, or may use different base addresses with different offset addresses to access different locations in different on-chip memory units.

By providing the hybrid memory addressing scheme in each memory unit 125, efficiency of memory access can be improved. The dual memory regions allow parallel threads to access an on-chip memory with high efficiency by minimizing the memory access conflicts among the threads. Hence, the threads may concurrently access the on-chip memory in one memory access cycle.

The operations of the flow diagrams of FIGS. 5 and 6 have been described with reference to the exemplary embodiments of FIGS. 1-4. However, it should be understood that the operations of the flow diagrams of FIGS. 5 and 6 can be performed by embodiments of the invention other than the embodiments discussed with reference to FIGS. 1-4, and the embodiments discussed with reference to FIGS. 1-4 can perform operations different than those discussed with reference to the flow diagrams. While the flow diagrams of FIGS. 5 and 6 show a particular order of operations performed by certain embodiments of the invention, it should be understood that such order is exemplary (e.g., alternative embodiments may perform the operations in a different order, combine certain operations, overlap certain operations, etc.).

Various functional components or blocks have been described herein. As will be appreciated by persons skilled in the art, the functional blocks will preferably be implemented through circuits (either dedicated circuits, or general purpose circuits, which operate under the control of one or more processors and coded instructions), which will typically comprise transistors that are configured in such a way as to control the operation of the circuity in accordance with the functions and operations described herein.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A system operative to manage on-chip memory access for a plurality of threads, comprising:
  a plurality of parallel processing units to execute the threads;
  an on-chip memory including a plurality of memory units and each memory unit includes a first region and a second region, wherein the first region and the second region have different memory addressing schemes for parallel access by the threads; and
  an address decoder coupled to the parallel processing units and the on-chip memory, the address decoder operative to:
    compare a requested address with a boundary address that marks a boundary between the first region and the second region,
    in response to a first comparison result, decode the requested address for memory access according to a first memory addressing scheme of the first region, in response to a second comparison result, decode the requested address for memory access according to a second memory address scheme of the second region, and
    activate the parallel access by the threads to memory locations in one of the first region and the second region according to decoded address signals, wherein
    according to the first memory addressing scheme, the threads use a same base address with different offsets to concurrently access a same one of the memory units, and
    according to the second memory addressing scheme, the threads use different base addresses to concurrently access different ones of the memory units.

2. The system of claim 1, wherein the first region is allocated to the threads such that each thread is allocated with memory locations at a respective fixed offset address.

3. The system of claim 2, wherein the parallel processing units are operative to cause the threads, in one memory access cycle, to concurrently access consecutive memory locations in the first region of the same one of the memory units according to the same base address.

4. The system of claim 1, wherein the second region is allocated to the threads such that each thread is allocated with consecutive memory locations in a respective one of the memory units.

5. The system of claim 4, wherein the parallel processing units are operative to cause the threads, in one memory access cycle, to concurrently access corresponding memory locations in second regions of different memory units according to a same offset address.

6. The system of claim 1, wherein memory locations are allocated to the threads in one of the first region and the second region in the on-chip memory based on a memory access pattern of the threads.

7. The system of claim 1, wherein the first region and the second region in each of the memory units are defined by a boundary configurable by software.

8. The system of claim 1, wherein the first region and the second region in each of the memory units are defined by a hardwired boundary.

9. A system operative to manage memory allocation, comprising:
  a plurality of parallel processing units;
  an on-chip memory including a plurality of memory units and each memory unit includes a first region and a second region, wherein the first region and the second region have different memory addressing schemes for parallel access by the threads; and
  an address decoder coupled to the parallel processing units and the on-chip memory, the address decoder operative to:
    receive requests from the threads to access an on-chip memory in parallel, each request specifying a requested address for memory access,
    compare a requested address with a boundary address that marks a boundary between the first region and the second region,
    in response to a first comparison result, decode the requested address for memory access according to a first memory addressing scheme of the first region, in response to a second comparison result, decode the requested address for memory access according to a second memory address scheme of the second region, and activate the parallel access by the threads to memory locations in one of the first region and the second region according to decoded address signals, wherein according to the first memory addressing scheme, the threads use a same base address with different offsets to concurrently access a same one of the memory units, and according to the second memory addressing scheme, the threads use different base addresses to concurrently access different ones of the memory units.

10. The system of claim 9, wherein the first region is allocated to the threads such that each thread is allocated with memory locations at a respective fixed offset address, and the second region is allocated to the threads such that each thread is allocated with consecutive memory locations in a respective one of the memory units.

11. The system of claim 9, wherein first regions of the memory units are of a same first size and second region of the memory units are of a same second size.

12. The system of claim 9, wherein the address decoder is further operative to cause the threads, in one memory access cycle, to concurrently access consecutive memory locations in the first region of the same one of the memory units according to the same base address.

13. The system of claim 9, wherein the address decoder is further operative to cause the threads, in one memory access cycle, to concurrently access corresponding memory locations in second regions of different memory units according to a same offset address.

14. The system of claim 9, wherein memory locations are allocated to the threads in one of the first region and the second region in the on-chip memory based on a memory access pattern of the threads.

15. A method performed by an address decoder coupled to parallel processing units that execute a plurality of threads of a process, comprising:

receiving requests from the threads to access in parallel an on-chip memory that includes a plurality of memory units, each request specifying a requested address for memory access;

comparing the requested address with a boundary address that marks a boundary between the first region and the second region, wherein the first region and the second region have different memory addressing schemes for the parallel access by the threads;

in response to a first comparison result, decode the requested address for memory access according to a first memory addressing scheme of the first region, in response to a second comparison result, decode the requested address for memory access according to a second memory address scheme of the second region; and activating the parallel access by the threads to memory locations in one of the first region and the second region according to decoded address signals, wherein according to the first memory addressing scheme, the threads use a same base address with different offsets to concurrently access a same one of the memory units, and according to the second memory addressing scheme, the threads use different base addresses to concurrently access different ones of the memory units.

16. The method of claim 15, wherein the first region is allocated to the threads such that each thread is allocated with memory locations at a respective fixed offset address, and the second region is allocated to the threads such that each thread is allocated with consecutive memory locations in a respective one of the memory units.

17. The method of claim 15, further comprising:

accessing, by the threads in parallel in one memory access cycle, consecutive memory locations in the first region of the same one of the memory units according to the same base address.

18. The method of claim 15, further comprising:

accessing, by the threads in parallel in one memory access cycle, corresponding memory locations in second regions of different memory units according to a same offset address.

19. The method of claim 15, wherein memory locations are allocated to the threads in one of the first region and the second region in the on-chip memory based on a memory access pattern of the process.

20. The method of claim 15, wherein the boundary is configurable by software.

21. The method of claim 15, wherein the boundary is hardwired.

* * * * *